(12) United States Patent
Schlenk et al.

(10) Patent No.: US 7,233,399 B2
(45) Date of Patent: Jun. 19, 2007

(54) FEEDBACK CONTROL OF AN INTERFEROMETER

(75) Inventors: Ralph Schlenk, Erlangen (DE); David Stahl, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 192 days.

(21) Appl. No.: 10/963,270

(22) Filed: Oct. 12, 2004

(65) Prior Publication Data

US 2005/0088659 A1  Apr. 28, 2005

(30) Foreign Application Priority Data

Oct. 23, 2003 (DE) ............................... 103 49 736

(51) Int. Cl.
*G01B 9/02* (2006.01)
*H04B 10/04* (2006.01)

(52) U.S. Cl. ...................................... 356/477; 398/183
(58) Field of Classification Search ............... 356/477; 398/183, 192, 195
See application file for complete search history.

(56) References Cited

U.S. PATENT DOCUMENTS

| | | | | |
|---|---|---|---|---|
| 4,552,457 A | * | 11/1985 | Giallorenzi et al. | 356/477 |
| 5,114,226 A | * | 5/1992 | Goodwin et al. | 356/4.09 |
| 6,271,959 B1 | * | 8/2001 | Kim et al. | 359/325 |
| 2004/0208647 A1 | * | 10/2004 | Gill et al. | 398/188 |

OTHER PUBLICATIONS

Pennickx, D. et al. "Optical Differential Phase Shif Keying (DPSK) direct detection considered as a duobinary signal". 27th Proceeding of the European Conference on Optical Communication. 2001, vol. 3, pp. 456-457.*

* cited by examiner

*Primary Examiner*—Gregory J. Toatley, Jr.
*Assistant Examiner*—Michael A. Lyons

(57) ABSTRACT

The invention proposes a method for feedback control, in which a portion of a data signal is split and rectified and the signal intensity is detected with slow speed electronics for improving the control of a delay line interferometer (DLI) used in optical data transmission. A control signal is generated and fed back to the DLI based on the detected signal intensity. The invention further proposes a device provided with a DLI, a first and second optoelectronic component, and a differential amplifier.

32 Claims, 3 Drawing Sheets

FEEDBACK CONTROL OF AN INTERFEROMETER

CROSS-REFERENCE TO RELATED APPLICATIONS

This application claims priority of European Application No. 103 49 736.6 filed on Oct. 23, 2003.

BACKGROUND OF THE INVENTION

1. Technical Field

The invention relates to data transmission via optical signals in general and especially to a method and a device for automatic control of a delay line.

2. Description of the Related Art

For data transmissions in telecommunication and for data transfer optical signals are increasingly employed. In the past years the speed of data transmission via fiber optical connections increased quite considerably.

To achieve high bandwidths in optical data transmission advanced modulation formats are required. While amplitude modulation is still predominant, advanced modulation formats often make use of an additional phase modulation. Among the advanced modulation formats which will be implemented first due to their simplicity are duobinary coding and differential phase shift keying (DPSK). For duobinary coding and DPSK, as for some other modulation formats, a logical EXOR or "modulo 2" operation of the signal can be necessary in the modulator or demodulator.

The realization of such operation by means of an electrical circuit faces difficulties, but in the optical domain it can be realized by using a delay line interferometer (DLI).

Optical DLIs require high accuracy with respect to delay-to-bitrate mismatch and delay line phase offset. While delay-to-bitrate mismatch does not affect the interference properties of the DLI and also leads to only minor signal distortion, the signal is sensitive to delay line phase offset. This results from the fact that the functionality of an interferometer fundamentally relies on the exactly constructive and destructive interference between two optical fields.

As delay line phase offset or delay line phase tuning depends on various factors, like for instance temperature, laser frequency variation or polarization state, it is necessary in a commercial system to provide an automatic control.

With Mach-Zehnder modulators (MZM), operating on a similar interferometric principle, a phase control can be realized relatively straightforward, because variations of the interference properties have a direct effect on the signal form. A DLI however cannot be controlled in the same way, because the signal, in contrast to a MZM, interferes with a delayed version of itself, resulting in no direct effect on the amplitude of the signal.

In experiments known from literature DLIs are usually manually finetuned. In a commercial system however a manual adjustment cannot be realized.

One prior art solution proposes a method for an automatic control of a DLI where the carrier must be present in the transmitted spectrum. This however disadvantageously requires a deliberate detuning of the phase modulator to a certain extent and results in a signal distortion.

BRIEF SUMMARY OF THE INVENTION

Therefore, it is one object of embodiments of the present invention to show a way how the control of a DLI employed in optical data transmission for modulation and demodulation of optical signals, especially for duobinary coding and for the demodulation of DPSK modulated optical signals, can be improved. This is achieved in a surprisingly simple manner discussed below. Advantageous embodiments and refinements are defined in the respective dependent claims.

Accordingly, one embodiment of the inventive method for controlling of an interferometer comprises the receiving of a modulated optical signal at the input of a DLI. In the DLI the signal is split into a first and a second partial signal, for instance by means of an optical 50:50 splitter. The two optical partial signals are guided within the DLI by a first and second line respectively, wherein the second optical partial signal is delayed with respect to the first optical partial signal by a variable delay time $\tau$.

By coupling of the two partial signals a first and a second output signal of the DLI is generated. This can be achieved for instance by means of an optical coupler. Through coupling the two optical partial signals the first and the second output signals of the DLI have a phase difference of $\pi/2$ radian. The first optical output signal of the DLI is transformed into a first electrical signal and the second optical output signal is transformed into a second electrical signal. Depending on the first and second electrical signals a third electrical signal is generated. Depending on this third electrical signal a feedback signal for control of the DLI is generated. The feedback signal is fed to the DLI and depending on the feedback signal the delay time $\tau$ is adjusted.

By adjusting the delay time $\tau$ a phase tuning between the first and the second optical partial signal is achieved.

Particularly advantageously the method can be utilized for the demodulation of a DPSK modulated optical signal and/or for generating a duobinary coding of an optical signal. With particular advantage the generating of the third electrical signal further comprises generating the difference of the first and the second electrical signal.

Especially by this, the invention has the advantage over known methods that the carrier of the transmitted spectrum does not have to be detected, which would lead to a signal distortion. Instead, the RF signal power (Radio Frequency) is detected by generating the difference of the first and the second electrical signal and from that the feedback signal is generated. Hence the DLI is controlled without the carrier signal.

Advantageously the third electrical signal is preferably amplified prior to further processing. This can be achieved preferably by means of a differential amplifier in conjunction with generating the difference of the first and second electrical signals.

Particularly advantageously the generating of the feedback signal preferably comprises a power detection of an electrical signal. Also the mixing of two electrical signals can be performed. Usually the power detection further comprises the rectifying of the electrical signal.

At least for ranges of a phase detuning of the DLI the detected signal power shows strong changes with small changes in the phase tuning, which makes the power detection especially suitable for the generating of a feedback signal.

Further preferably, the process comprises filtering of frequencies of an electrical signal. By the filtering of the electrical signal, for instance via a band-pass or a low-pass filter, a decoupling is achieved from effects, which can change the RF baseband spectrum, like for instance polarization mode dispersion (PMD).

Preferably, the generating of the feedback signal comprises processing a signal, especially the signal generated by power detection, by means of a circuit logic. With advantage a signal processor, especially a digital signal processor, can be used for the processing.

Furthermore, it is in the scope of the invention to process an additional signal by means of the circuit logic or the signal processor, said additional signal being generated by separate means and also containing information about the quality of the phase tuning of the DLI.

Preferably the generating of a feedback signal can further comprise storing of information. When phase tuning the DLI the third electrical signal shows periodical minima, especially zeros. Adjusting of the delay time τ depending on the feedback signal advantageously comprises a start sequence. During this start sequence the delay time is tuned through a range Δτ and for this range the feedback signal is stored and evaluated. The distance between two minima is known. Therefore, when a minimum is found during phase tuning of the DLI, an offset can be applied to the phase with regard to this minimum. In order to achieve an optimal starting adjustment this offset equals half of said known distance between two minima. By means of such start algorithm the starting time of a modulation or demodulation system can be reduced significantly.

For converting the first and the second optical output signal of the DLI into a first and a second electrical signal advantageously a first and a second optoelectronic component, in particular a first and a second photo diode, can be used.

The adjusting of the delay time τ in the DLI is preferably achieved by heating and/or cooling at least one of the two lines, in which the optical partial signals are guided. Thereby it is taken advantage of the fact that the optical path length of a waveguide changes with temperature.

In addition to the phase adjustment of the DLI it can be necessary to perform a polarization adjustment. For this purpose the method advantageously comprises adjusting the polarization of at least one optical signal by means of a polarization controller.

An inventive device according to one embodiment for processing an optical signal comprises a DLI with a first and a second output, a first optoelectronic component connected with the first output of the DLI, a second optoelectronic component connected with the second output of the DLI, as also a differential amplifier, the inputs of which are connected with the two optoelectronic components.

With this device an automatic feedback loop for controlling a DLI is given, which is based on the detection of RF signal intensity. Preferably the first and the second optoelectronic component are provided of the same kind, for instance as a first and a second photo diode of the same type. Essentially the DLI is controlled by means of an output signal of the differential amplifier.

Advantageously, the device comprises means for power detection of an electrical signal and/or to square an electrical signal for signal processing. Further advantageously the device can comprise a signal mixer for mixing two electrical signals. For this purpose the device is preferably provided with a local oscillator. Further inventive means for signal processing comprise a band-pass and/or low-pass filter and a rectifier.

With advantage the device furthermore comprises means for generating a control signal to control the DLI. In order to generate the control signal out of the detected and processed signal, advantageously the device is provided with a circuit logic. Further advantageously the device can comprise a signal processor, in particular a digital signal processor and a storage means.

Advantageously, the means for generating a control signal can have a signal input for an additional signal, which is generated by separate means and which also contains information about the quality of the phase tuning of the DLI.

The DLI can be provided with optical fibers, in particular with polarization maintaining fibers (PMF), for guiding the optical signals. Alternatively or additionally the DLI can also comprise waveguides applied on a substrate.

The DLI can comprise a heating and/or cooling means for phase tuning. Depending on the specific construction of the DLI, for this purpose other means, like for instance a piezoelectric transducer (PZT) or a micromechanical position controller, can also be utilized. For polarization control the DLI can further comprise a polarization controller.

The means for phase and/or polarization adjustment are provided as being controllable in order to control these by means of a control signal.

In the following the invention is described in more detail by means of preferred embodiments and with reference to the enclosed drawings. Thereby same reference marks in the drawings indicate same or similar parts.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown.

In the drawings.

DETAILED DESCRIPTION OF THE INVENTION

In the embodiments described hereinafter the DLI 20 is utilized as a demodulator for a DPSK modulated optical signal. However, the invention is not limited to this purpose. For instance the DLI 20 could also be used for the modulation of a duobinary coding or for other modulation and/or demodulation purposes.

Figure 1:
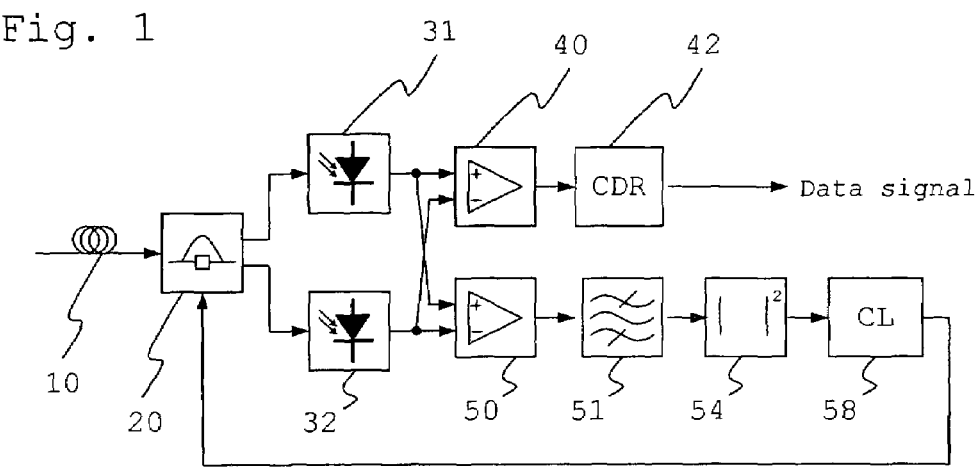
FIG. 1 is a schematic block diagram of a first embodiment of an inventive feedback control device.

FIG. 1 shows a block diagram of a first embodiment of an inventive feedback control device. Via an optical fiber 10 a DPSK modulated optical signal is received and fed into the input of the DLI 20 in which the signal is demodulated. The optical output signals of the DLI, which are phase-shifted by π/2 radian, are fed into a first 31 and a second 32 photo diode respectively and are converted into electrical signals by means of said photo diodes.

The device is provided with two circuit branches, a data branch and a feedback branch.

In the data branch the electrical signals of the photo diodes 31 and 32 are fed into a first differential amplifier 40 in such a way that each of the signals is connected to one of the inputs of the differential amplifier 40. The output signal of the differential amplifier 40 of the data branch is fed into a means 42 for clock and data recovery (CDR) in order to generate the data signal.

In the feedback branch the electrical signals of the photo diodes 31 and 32 are fed into a second differential amplifier 50 in such a way that each of the signals is connected to one of the inputs of the differential amplifier 50. In this preferred embodiment a band-pass filter 51, a power detector 54 and means 58 for generating the control signal are provided following the differential amplifier 50 of the feedback branch in the circuit, wherein the means 58 for generating the control signal comprises a circuit logic (CL). The means 58 can preferably further comprise a signal processor, in particular a digital signal processor.

The underlying principle of the feedback control loop, which was verified by the inventors in simulation and experiment, proposes to split a portion of the actual data signal before the means 42 for clock and data recovery, to rectify it and to detect the RF signal intensity with slow speed electronics and on the basis of this signal to generate the control signal and feed it back to the DLI 20.

Figure 2:
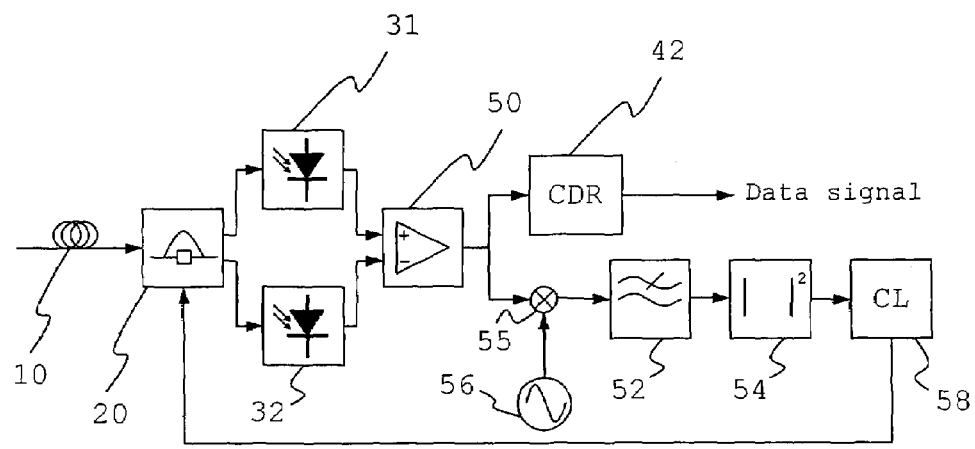
FIG. 2 is a schematic block diagram of another embodiment of an inventive feedback control device.
Figure 3:
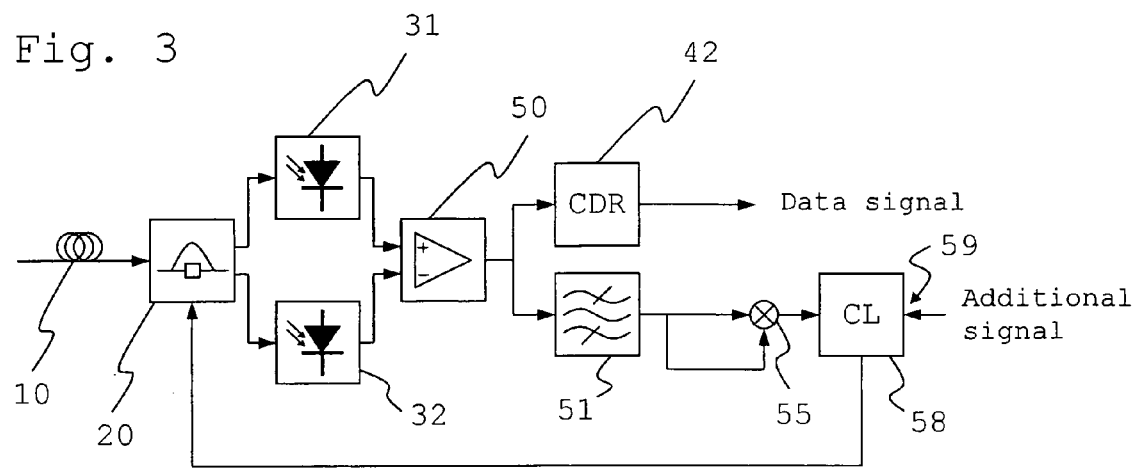
FIG. 3 is a schematic block diagram of still another embodiment of an inventive feedback control device.

FIGS. 2 and 3 show further preferred embodiments of an inventive feedback control device, in which a mutual differential amplifier 50 is used for the data branch and the feedback branch.

In the feedback branch of the embodiment as shown in FIG. 2 a signal mixer 55 is provided following or downstream of the differential amplifier 50, wherein the signal mixer 55 mixes the signal with a signal generated by a sinus generator 56. A low-pass filter 52, a power detector 54 and means 58 for generating the control signal are provided in the circuit following the signal mixer 55.

The combination of signal mixer 55 and low-pass filter 52 can yield an improved signal quality compared to the band-pass filter 51 used in FIG. 1.

FIG. 3 shows an embodiment, in which, similar to FIG. 1, a band-pass filter 51 is provided following the differential amplifier 50 in the feedback branch. Here the output signal of the band-pass filter 51 is mixed with itself by means of a signal mixer 55 and the mixed signal is fed into the circuit logic 58. With this layout of the inventive device a power detector 54 can be omitted.

FIG. 3 further shows the variation to feed an additional signal into the circuit logic 58 via a separate signal input 59. Said additional signal is generated by separate means and containing information about the quality of the phase tuning of the DLI 20. This additional signal can be taken into account as additional parameter by the circuit logic 58 when generating the feedback signal.

Figure 4:
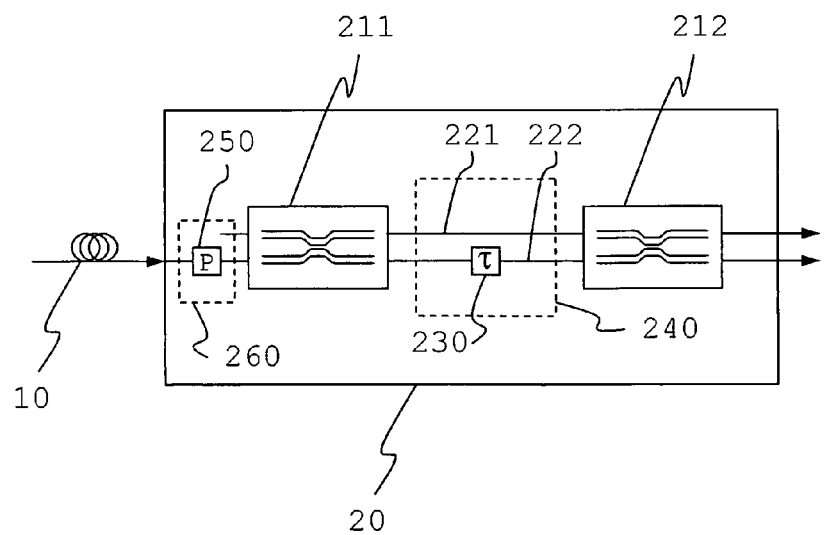
FIG. 4 is a schematic layout of a DLI.

Exemplary FIG. 4 shows a schematic layout of a DLI. The optical signal fed into the input of the DLI 20 via an optical fiber 10 is split by a first optical coupler 211 into two partial signals, which are guided to a second optical coupler 212 by a first 221 and a second 222 line. The second line 222 is provided with a delay line 230, so that this line 222 is able to delay the optical signal, which is guided in the second line 222, by a delay time τ with respect to the optical signal, which is guided in the first line 221. In order to adjust the delay time τ the DLI is provided with a control unit 240, which is controllable by a control signal. For instance, the control unit 240 can be provided as a heating and/or cooling element or also as a PZT.

In this embodiment the DLI furthermore comprises a polarization controller 250, which can be controlled by means of an according control unit 260. For controlling the control unit 260 a second feedback signal can be provided.

Figure 5:
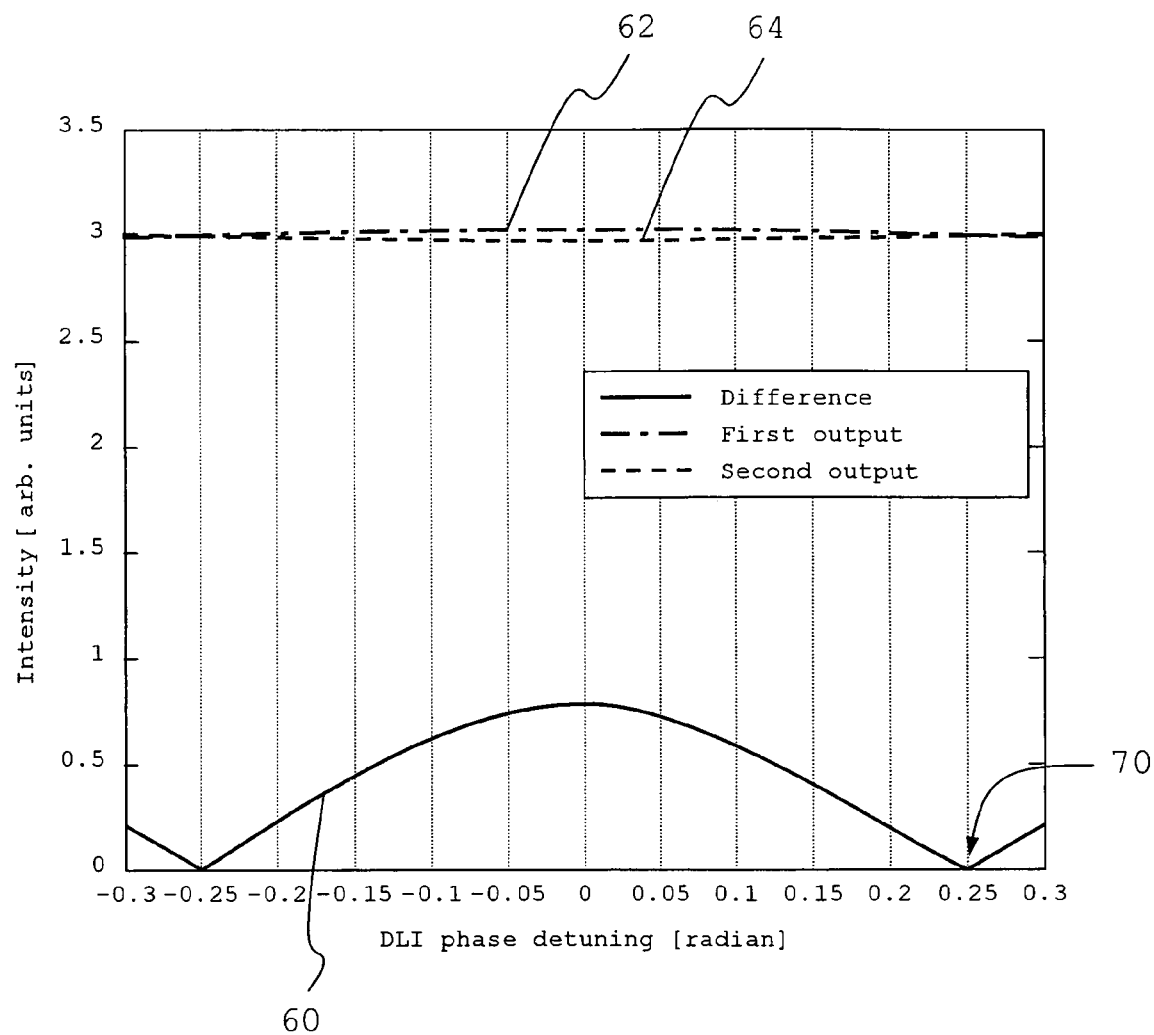
FIG. 5 is a diagram in which the signal intensity is shown as a function of the detuning of the DLI.

Although it would be sufficient for the reception of a duobinary coded signal to detect only one output of the DLI with only one photo diode for instance, the particular advantage of generating a control signal from the difference of both output signals of the DLI is apparent from FIG. 5.

FIG. 5 shows a simulation of the signal intensity of the signal detected in the feedback branch in arbitrary units as a function of the phase detuning of the DLI in radian. The signal intensity for detecting the first and the second output signal of the DLI separately, each with only one photo diode, is indicated by reference signs 62 and 64 respectively. The signal intensity for detecting the difference of both output signals of the DLI using two photo diodes and a differential amplifier is indicated by reference sign 60. It is clearly apparent that the inventive signal shape 60 is far better suitable for a feedback control due to the higher gradient. Furthermore the inventive signal shape 60 has zeros 70, whereby the controlling, in particular the amplifying, the scaling and the pre-adjusting by means of a start sequence is simplified significantly.

In the simulation a squaring of the detected signal is performed. By this squaring it results, that the inventive signal shape 60 is not identical to the difference of the signal shapes 62 and 64. In the case of the inventive signal shape the squaring is performed after generating the difference by means of the differential amplifier. A subtraction of the signal shapes 62 and 64 on the other hand represents generating the difference after squaring, which does not lead to a practical control signal.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCE MARKS

10 Optical fiber
20 DLI
31, 32 Photo diodes
40, 50 Differential amplifiers
42 Means for clock and data recovery (CDR)
51 Band-pass filter
52 Low-pass filter
54 Power detector
55 Signal mixer
56 Sinus generator
58 Circuit logic (CL)
59 Separate signal input
60 Signal intensity when detecting the difference of the output signals of the DLI
62 Signal intensity when detecting the first output signal of the DLI
64 Signal intensity when detecting the second output signal of the DLI
70 Zero
211, 212 Optical couplers
221, 222 Optical lines
230 Delay line
240 Control unit for phase control of the DLI
250 Polarization controller
260 Control unit for polarization control

We claim:

1. A method for controlling an interferometer, comprising the steps of:
    receiving a modulated optical signal,
    guiding the modulated optical signal to an input of the interferometer, splitting the modulated optical signal into a first and a second optical partial signal,
guiding the first optical partial signal in a first line,
guiding the second optical partial signal in a second line, wherein the second optical partial signal is delayed by a variable delay time τ with respect to the first optical partial signal,
generating a first and a second optical output signal of the interferometer by coupling of the first and the second optical partial signals,
transforming the first optical output signal of the interferometer into a first electrical signal,
transforming the second optical output signal of the interferometer into a second electrical signal,
generating a third electrical signal depending on the first and the second electrical signals,
generating a feedback signal depending on the third electrical signal,
feeding the feedback signal into the interferometer, and
adjusting the delay time τ depending on the feedback signal,
wherein said generating the feedback signal comprises processing an additional signal, which is generated by separate means and contains information about the quality of the phase tuning of the interferometer.

2. The method according to claim 1, wherein said receiving a modulated optical signal comprises receiving an optical signal modulated with differential phase shift keying and/or with duobinary coding.

3. The method according to claim 1, wherein said generating the third electrical signal comprises generating the difference of the first and the second electrical signal.

4. The method according to claim 1, wherein said generating the third electrical signal comprises amplifying an electrical signal.

5. The method according to claim 1, wherein said generating the feedback signal comprises detecting the power of an electrical signal.

6. The method according to claim 1, wherein said generating the feedback signal comprises mixing of two electrical signals.

7. The method according to claim 1, wherein said generating the feedback signal comprises filtering of frequencies of an electrical signal.

8. The method according to claim 1, wherein said generating the feedback signal comprises processing a signal by means of a circuit logic.

9. The method according to claim 1, wherein said generating the feedback signal comprises processing a signal by means of a digital signal processor.

10. The method according to claim 1, wherein said generating the feedback signal comprises storing information.

11. The method according to claim 1, wherein said adjusting the delay time τ depending on the feedback signal comprises a start sequence, in which the delay time is tuned through a range Δτ and for this range the feedback signal is stored and evaluated.

12. The method according to claim 1, wherein said transforming the first and the second optical output signal of the interferometer into a first and a second electrical signal is performed by means of a first and a second optoelectronic component.

13. The method according to claim 12, wherein said transforming is performed by means of a first and a second photo diode.

14. The method according to claim 1, wherein said adjusting the delay time τ comprises heating and/or cooling of at least one of the lines, in which the optical partial signals are guided.

15. The method according to claim 1, wherein the polarization of at least one optical signal is adjusted by means of a polarization controller.

16. A device for processing an optical signal, comprising
a delay line interferometer including a first and a second output,
a first optoelectronic component which is connected to the first output of the delay line interferometer,
a second optoelectronic component which is connected to the second output of the delay line interferometer,
a differential amplifier having inputs which are connected to the two optoelectronic components,
the device further comprising means for generating a control signal for adjusting the delay line interferometer,
wherein said means for generating a control signal comprises a signal input for an additional signal, which is generated by separate means and contains information about the quality of the phase tuning of the delay line interferometer.

17. The device according to claim 16, further comprising means for power detection of an electrical signal and/or for squaring of an electrical signal.

18. The device according to claim 16, further comprising a signal mixer for mixing two electrical signals.

19. The device according claim 18, further comprising a local oscillator.

20. The device according to claim 16, further comprising a band-pass filter and/or a low-pass filter for filtering of frequencies of an electrical signal.

21. The device according to claim 16, further comprising a circuit logic.

22. The device according to claim 16, further comprising a signal processor or a digital signal processor.

23. The device according to claim 16, further comprising storage means.

24. The device according to claim 16, wherein said first and second optoelectronic components are similar.

25. The device according to claim 16, wherein said first and second optoelectronic components are provided in the form of a first and a second photo diode respectively.

26. The device according to claim 16, wherein said delay line interferometer is provided with at least one optical fiber.

27. The device according to claim 26, wherein said at least one optical fiber is provided as a polarization maintaining optical fiber.

28. The device according to claim 16, wherein said delay line interferometer is provided with at least one waveguide applied on a substrate.

29. The device according to claim 16, wherein said delay line interferometer is provided with heating means.

30. The device according to claim 16, wherein said delay line interferometer is provided with cooling means.

31. The device according to claim 16, wherein said delay line interferometer is provided with at least one micromechanical position controller.

32. The device according to claim 16, wherein said delay line interferometer is provided with means for polarization control of an optical signal.

* * * * *